United States Patent
Wang (10) Patent No.: US 6,542,465 B1
(45) Date of Patent: Apr. 1, 2003

(54) METHOD FOR FLOW CONTROL IN ASYMMETRIC DIGITAL SUBSCRIBER LINE DEVICES

(75) Inventor: Ray Wang, Centreville, VA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,575

(22) Filed: May 28, 1999

(51) Int. Cl.[7] .............................. G08C 15/00; H04L 1/16

(52) U.S. Cl. .................... 370/232; 370/235; 370/395.1; 370/485; 375/219; 379/93.01

(58) Field of Search ................................ 370/229, 230, 370/230.1, 231, 232, 233, 235, 235.1, 236, 395.1, 395.2, 395.21, 395.43, 395.71, 485; 375/219, 220, 222; 379/93.01, 93.08

(56) References Cited

U.S. PATENT DOCUMENTS

| | | | |
|---|---|---|---|
| 5,408,260 A | | 4/1995 | Arnon |
| 5,519,731 A | | 5/1996 | Cioffi |
| 5,521,906 A | | 5/1996 | Grube et al. |
| 5,619,505 A | | 4/1997 | Grube et al. |
| 5,627,501 A | | 5/1997 | Biran et al. |
| 5,822,374 A | | 10/1998 | Levin |
| 5,889,856 A | | 3/1999 | O'Toole et al. |
| 5,910,970 A | | 6/1999 | Lu |
| 5,999,518 A | | 12/1999 | Nattkemper et al. |
| 5,999,563 A | * | 12/1999 | Polley et al. ............. 370/229 |
| 6,049,531 A | | 4/2000 | Roy |
| 6,101,216 A | * | 8/2000 | Henderson et al. ........ 375/222 |
| 6,137,777 A | * | 10/2000 | Vaid et al. ................. 370/230 |
| 6,208,637 B1 | | 3/2001 | Eames |
| 6,215,793 B1 | * | 4/2001 | Gultekin et al. ........... 370/464 |
| 6,345,071 B1 | * | 2/2002 | Hamdi ...................... 370/252 |
| 6,374,288 B1 | * | 4/2002 | Bhagavath et al. ........ 375/222 |
| 6,388,990 B1 | * | 5/2002 | Wetzel ...................... 370/230 |

FOREIGN PATENT DOCUMENTS

| | | |
|---|---|---|
| WO | WO 99/12330 | 3/1997 |
| WO | WO 98/47251 | 10/1998 |

OTHER PUBLICATIONS

ADSLForumTR–001, "ADSL Forum System References Model," ADSL Forum Technical Report, May 1996, pp. 1 to 7.

Technical Report TR–002, "ATM over ADSL Recommendations," ADSL Forum Technical Report, Mar. 1997, pp. 1 to 17.

(List continued on next page.)

Primary Examiner—Hassan Kizou
Assistant Examiner—David Odland
(74) Attorney, Agent, or Firm—McDonnell Boehnen Hulbert & Berghoff (57) ABSTRACT

A method for flow control in asymmetric digital subscriber line ("ADSL") devices. The method includes flow control that adapts to changes in line conditions such as noise signals, onhook/offhook signals, etc. that may result in degradations in the quality-of-service in an ADSL system. The flow control includes buffering outbound data and ceasing transmission of data at an original transmission rate on an ADSL device that is used on a customer site. An original data transmission rate is adjusted based on changes in line conditions. One more or data transmission characteristics may be adjusted before sending any data at a new data transmission rate. For example, Asynchronous Transport Mode ("ATM") often uses ADSL devices as a physical layer to transmit data. ATM available bit-rate, constant bit-rate, variable bit-rate or unspecified bit-rate transmission characteristics or ATM quality-of-service characteristics may be adjusted before sending any data at a new data transmission rate. Traffic shaping may be optionally applied to the data at the new data transmission rate. The method may be especially useful for maintaining a quality-of-service transmission at a lower transmission rate, using splitterless ADSLs, or "Lite ADSL" (e.g., G.lite).

23 Claims, 5 Drawing Sheets

OTHER PUBLICATIONS

Technical Report TR–007, "Interfaces and System Configurations for ADSL: Customer Premises," ADSL Forum Technical Report, Mar. 1998, pp. 1 to 26.

Kyees, P.J. et al., *ADSL: A New Twisted–Pair Access to the Information Highway*, IEEE Communications Magazine, vol. 33, Issue 4, Apr. 1995, pp. 52–60.

Huang, Yin–Hwa et al., *Design of an MPEG–Based Set–Top Box for Video on Demand Services*, Acoustics, Speech, and Signal Processing, 1995, ICASSP–95., 1995 International Conference, vol. 4, ISBN: 0–7803–2431–5, May 9–12, 1995, pp. 2655–2658.

* cited by examiner

METHOD FOR FLOW CONTROL IN ASYMMETRIC DIGITAL SUBSCRIBER LINE DEVICES

FIELD OF THE INVENTION

This invention relates to flow control in communication devices. More specifically it relates to a method for flow control in asymmetric digital subscriber line devices.

BACKGROUND OF THE INVENTION

Many applications used from digital computers are asymmetric. For example, video on demand, Internet access, intranet access, remote local area network access, multimedia access, are specialized services that typically require high data rates downstream, but have relatively low data rates demands upstream.

An Asymmetric Digital Subscriber Line ("ADSL"), is a communications technology that transmits an asymmetric data stream over a conventional twisted pair of telephone wires. An Asymmetric Digital Subscriber Line transmits a larger data rate downstream to a subscriber from a telephone switching office than from a subscriber back to the telephone switching office. Asymmetric Digital Subscriber Lines typically transmit about 1.5 Mega bits-per-second ("Mbps") to about 9 Mbps downstream to a subscriber, and about 16 kilo-bps ("kbps") to 640 kbps upstream back to a telephony switching office. The asymmetric data rates depend on a number of factors, including length of the twisted pair of copper wires, copper wire gauge, and cross-coupled interference.

ASDLs are described in several standards including those by the American National Standards Institute ("ANSI"), the International Telecommunication Union ("ITU") and others. For example, see "Network and Customer Installation Interfaces - Asymmetric Digital Subscriber Line (ADSL) Metallic interface," ANSI-T1.413-1995, or "Asymmetrical digital subscriber line (ADSL) transceiver," ITU-G.992.1-1999. Information about these standards can be obtained on the Internet at the Universal Resource Locators ("URLs") "www.ansi.org" and "www.itu.ch" respectively. In addition, more information can be obtained on ADSLs from the ADSL Forum at the URL "www.adsl.com."

An ADSL system typically comprises two asymmetric devices connected by a conventional twisted pair of copper wires. An ADSL Transmission Unit-Central ("ATU-C") is a device at one end of an ADSL connection at a telephony switching office. An ADSL Transmission Unit-Remote ("ATU-R") is a device at another end of an ADSL connection at a subscriber or customer site.

The ATU-R may be integrated into a service module. A service module typically converts received digital signals into signals suitable for particular subscriber or customer premise equipment. The ATU-C may be integrated within an access node. An access node typically includes digital loop carrier systems such as a Digital Subscriber Line Access Multiplexer ("DSLAM") concentrating individual voice lines to T1 lines, cellular antenna sites, Private Branch Exchanges ("PBXs"), Optical Network Units ("ONUs") or other carrier systems.

ADSL systems typically use Discrete Multi-Tone Modulation ("DMT") for data transmission. Low speed services, such as Plain Old Telephone Service ("POTS"), are carried in a baseline modulation frequency or low frequency, while higher speed multimedia services are modulated at higher frequencies.

Some applications require transport of packet data. An Asynchronous Transfer Mode ("ATM") system can use high speed services on ADSL systems as a physical layer to transport data packets. As is known in the art, ATM is a high-speed packet transmission mode. ATM segments and multiplexes data traffic into small, fixed-length units called "cells." A cell is 53-octects, with 5-octects for the cell header, and 48-octects for the cell data. ATM provides four services classes that may use constant bit-rates, variable bit-rates, available bit-rates and unspecified bit-rate services. The four ATM service classes can be used to provide Quality-of-Service ("QoS") functionality.

An ADSL system typically includes one or more "splitters." Splitters are filters that separate high frequency and low frequency ADSL signals. A splitter may be integrated into ATU-C or ATU-R, physically separated from the ATU-C or ATU-R, or divided between high pass and low pass functionality, with the low pass functionality physically separated from the ATU-C or ATU-R.

An ADSL system can also be used without splitters. The International Telecommunications Union's spilterless standard includes "Splitterless Asymmetrical Digital Subscriber Line Transceivers," ITU-G.992.2-1999. The Splitterless ADSL standard is also called "G.lite." G.lite is a new standard that uses DMT baseline modulation delivering a maximum downstream bandwidth of up to 1.4 Mbps, but is less sensitive to noise and other transmission problems.

There are several problems associated with using regular ADSL or Splitterless ASDL. Conditions may change on an ADSL connection. For example, a telephone may go on-hook or off-hook or noise may change conditions on the twisted pair of copper wires used for the ADSL connection. The change in condition may result in a degradation of signal quality on the connection. In addition, the change in condition may result in a degradation of a Quality-of-Service is being used (e.g., an ATM Quality-of-Service).

ADSL devices typically use a "Fast Retrain" procedure to adapt ADSL transmission characteristics to changing line conditions. As is known in the art, the Fast Retrain procedure includes quickly adjusting to line conditions including amplitude response, delay distortions, timing recovery and echo characteristics in an ADSL transmission system.

However, the result of the "Fast Retrain" procedure may be unable to sustain a Quality-of-Service as a lower speed traffic rate could be higher than that of a newly negotiated higher speed ATM traffic rate after recovery. Out-of-balance traffic rates will increase ADSL connection utilization, which in turn will discard data (e.g., ATM cells) and cause data retransmission. The retransmission may further decrease lower and higher speed traffic to throughput.

Thus, it is desirable to have a procedure to adapt ADSL transmission characteristics to changing line conditions using spliterless ADSL (i.e., G-lite). The procedure should adapt to changing ADSL line conditions without decreasing traffic throughput using splitterless ADSL as well as regular ADSL.

SUMMARY OF THE INVENTION

In accordance with preferred embodiments of the present invention, some of the problems associated with changing line conditions on ADSL connections using are overcome. A method for ADSL flow control is presented.

The method includes detecting a change on a first asymmetric network device on a connection between the first asymmetric network device and a second asymmetric network device in an asymmetric data transmission system. The detection includes but is not limited to, detecting any of a noise signal, onhook/offhook signal, ringing signal, or other signal. A data rate adaptation procedure is started to adapt the first data transmission rate based on the changed condition on the connection. A flow control procedure is invoked on the first asymmetric network device. The flow control procedure buffers outbound data and notifies an application layer on the first asymmetric network device to temporarily cease data transmission at the first data transmission rate. A second data transmission rate is invoked on the connection between the first asymmetric network device and the second asymmetric network device based on the change on the connection. The data transmission rate is adjusted on the first asymmetric network device to use the second data transmission rate on the connection between the first asymmetric network device and the second asymmetric network device.

Adjusting the data transmission rate includes notifying the application layer on the first asymmetric network device to resume data transmission at the second data transmission rate. Adjusting the data transmission rate may also include changing one or more data transmission characteristics used for the first data transmission rate before transmitting any data at the second data transmission rate.

The present invention may help adapt ADSL transmission characteristics to changing line conditions without decreasing data traffic throughput. The present invention may be especially useful for maintaining quality-of-service transmissions with a lower transmission rate, using splitterless ADSL (e.g., G.lite).

The foregoing and other features and advantages of preferred embodiments of the present invention will be more readily apparent from the following detailed description. The detailed description proceeds with references to the accompanying drawings.

DESCRIPTION OF THE DRAWINGS

Preferred embodiments of the present inventions are described with reference to the following drawings, wherein.

DETAILED DESCRIPTION OF PREFERRED EMBODIMENTS

Exemplary asymmetric data transmission system

Figure 1:
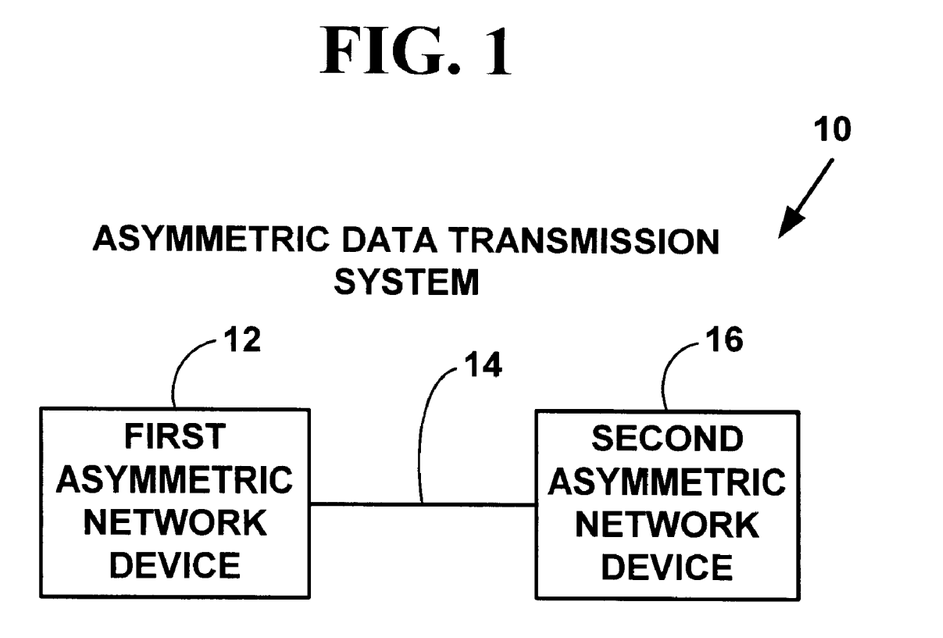
FIG. 1 is a block diagram illustrating an exemplary asymmetric data transmission system.

FIG. 1 is a block diagram illustrating an exemplary asymmetric data transmission system 10 for a preferred embodiment of the present invention. In the asymmetric data transmission system 10, data is transmitted at a higher data rate in a downstream direction, than in an upstream direction. However, the asymmetric data transmission can also be reversed. The asymmetric data transmission system 10 includes a first asymmetric network device 12, a connection 14, and a second asymmetric network device 16. However, the asymmetric data transmission system 10 is not limited the network devices and connection illustrated in FIG. 1, and more or fewer network devices and connections can also be used. Splitters are not illustrated in FIG. 1, and may or may not be used in the asymmetric data transmission system 10.

In one exemplary preferred embodiment of the present invention, the connection 14 is conventional twisted pair of copper wires. The first asymmetric network device 12 is an Asymmetric Digital Subscriber Line ("ADSL") Transmission Unit-Remote ("ATU-R"). The second asymmetric network device 16 is an ADSL Transmission Unit-Central ("ATU-C"). However, the present invention is not limited to this exemplary preferred embodiment and other network devices and connections can also be used.

The Asymmetric network devices 12, 16 for preferred embodiments of the present invention include network devices that can interact with the asymmetric network system 10 based on all or part of standards proposed by the Institute of Electrical and Electronic Engineers ("IEEE"), International Telecommunications Union-Telecommunication Standardization Sector ("ITU"), Internet Engineering Task Force ("IETF"), or American National Standard Institute ("ANSI"). However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf org." The ANSI standards can be found at the URL "www.ansi.org." The ANSI standard "Network and Customer Installation Interfaces - Asymmetric Digital Subscriber Line (ADSL) Metallic interface," ANSI-T1.413-1995, and the ITU standards "Asymmetrical digital subscriber line (ADSL) transceiver," ITU-G.992.1-1999, and "Splitterless Asymmetrical Digital Subscriber Line Transceivers," ITU-G.992.2-1999, are incorporated herein by reference.

An operating environment for asymmetric network devices 12,16 of the present invention include a processing system with one or more high speed Central Processing Unit(s) ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Exemplary asymmetric network device flow control

Figure 2:
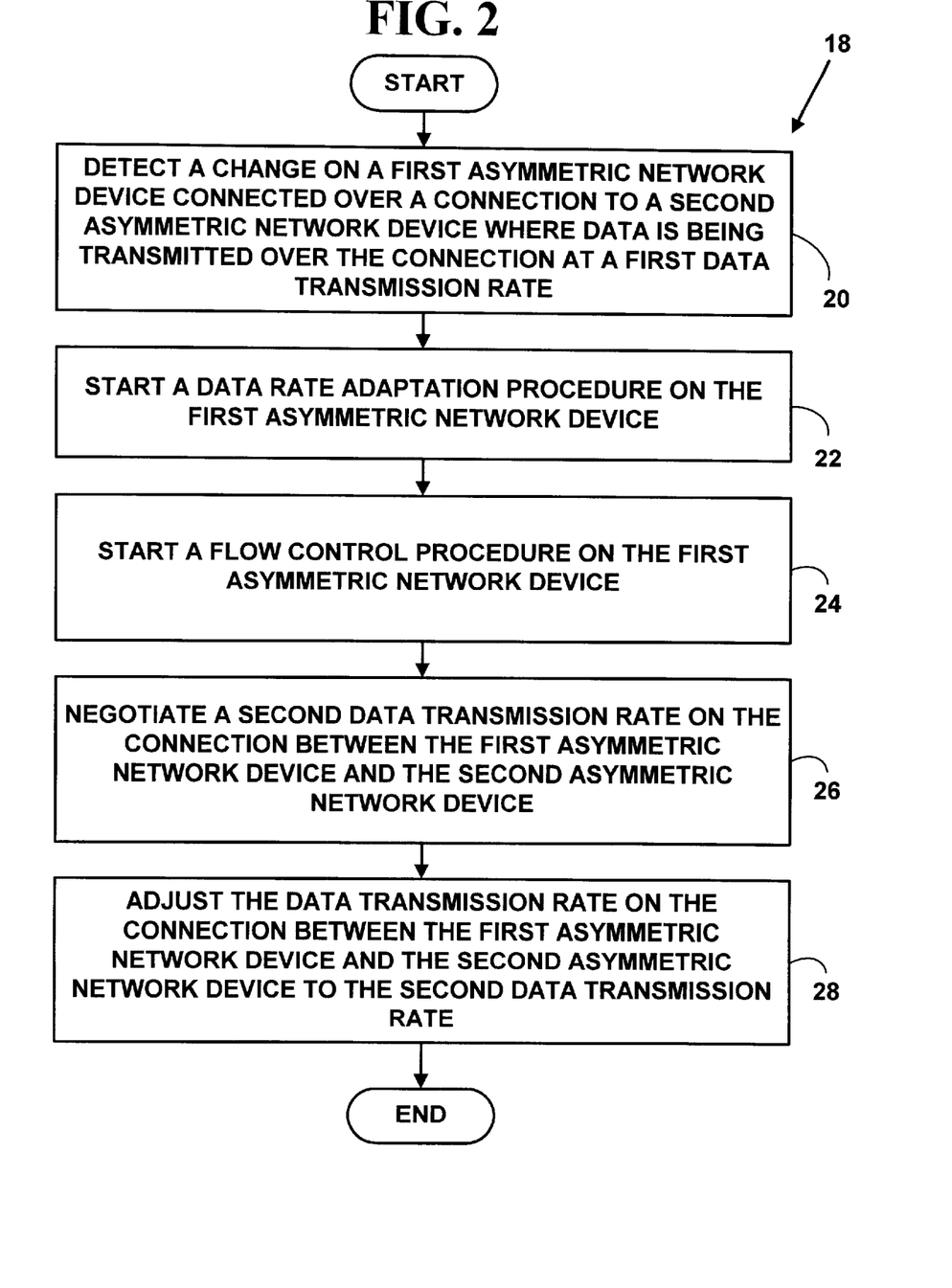
FIG. 2 is a flow diagram illustrating a method for flow control in an asymmetric data transmission system.

FIG. 2 is a flow diagram illustrating a Method 18 for flow control in an asymmetric data transmission system 10.

Method 18 includes detecting a change on a first asymmetric network device 12 on a connection 14 between the first asymmetric network device 12 and a second asymmetric network device 16 in an asymmetric data transmission system 10 at Step 20. Data is being transmitted between the first asymmetric network device 12 and the second asymmetric network device 16 over the connection 14 at a first data transmission data rate. Step 20 includes but is not limited to detecting any of a noise signal, an on-hook signal, an off-hook signal, or a ringing-signal or other signal on the connection 14. At Step 22, a data rate adaptation procedure is started on the first asymmetric network device to adapt the first data transmission rate based on the changed condition on the connection 14. A flow control procedure is stared on the first asymmetric network device 12 at Step 24. The flow control procedure buffers outbound data and notifies an application layer on the first asymmetric network device 12 to temporarily cease data transmission at the first data transmission rate. As is known in the art, the Open System Interconnection ("OSI") model includes seven layers used to define network functionality. The layers include from lowest-to-highest, include a physical, data-link, network, transport, session, presentation and application layer. At Step 26, a second data transmission rate is invoked on the connection 14 between the first asymmetric network device 12 and the second asymmetric network device 16 based on the change on the connection 14. At Step 28, the data transmission rate is adjusted on the first asymmetric network device 12 to use the second data transmission rate on the connection 14 between the first asymmetric network device 12 and the second asymmetric network device 16.

Adjusting the data transmission rate includes determining whether the second data transmission rate is faster than a peak data rate, and if so, notifying the application layer on the first asymmetric network device 12 to resume data transmission at the second data transmission rate. Adjusting the data transmission rate may also include determining if the second data transmission rate is slower than the first data transmission rate, and if so, changing one or more data transmission characteristics used for the first data transmission rate before transmitting any At data at the second data transmission rate.

In one exemplary preferred embodiment of the present invention, the peak data rate is a peak cell rate used for used for Asynchronous Transfer Mode ("ATM") cell transmission on the connection. The data transmission characteristics used for the first transmission rate may include any of available bit-rate characteristics, unspecified bit-rate characteristics, variable bit-rate characteristics, or constant bit-rate characteristics used for ATM cell transmission on the connection. However, the present invention is not limited ATM cell rates or ATM data transmission characteristics, and other data transmission rates, and data transmission characteristics can also be used.

As was discussed above, ATM is a high-speed packet transmission mode. ATM segments and multiplexes data traffic into small, fixed-length units called "cells." A cell is 53-octects, with 5-octects for the cell header, and 48-octects for the cell data. ATM often uses ADSL technologies as a physical layer to transmit packet data. For more information on ATM, see "B-ISDN ATM Adaptation Layer specification," ITU-I.363.3-1996, and "Functional characteristics of ATM equipment, ITU-I.732-1996, and "Functional Architecture of transport networks based on ATM," ITU-1.326-1995, incorporated herein by reference.

In one exemplary preferred embodiment of the present invention, the asymmetric data transmission system 10 includes asymmetric network devices compliant with all or part of ANSI or ITU ADSL standards. (e.g., ANSI-T1.413-1995 or ITU-G.992.1-1999). In another exemplary preferred embodiment of the present invention, the asymmetric data transmission system 10 includes a splitterless ADSL data transmission system with network devices compliant with all or part of ITU splitterless ADSL standards. (e.g., ITU-G.992.2-1999). The first asymmetric network device 12 is an ADSL ATU-R device, the second asymmetric device 16 is an ADSL ATU-C device, and the connection 14 is a conventional twisted pair of copper wires. However, the present invention is not limited to this embodiment and other asymmetric network devices and connections can also be used.

Asymmetric digital subscriber line data transmission system

Figure 3:
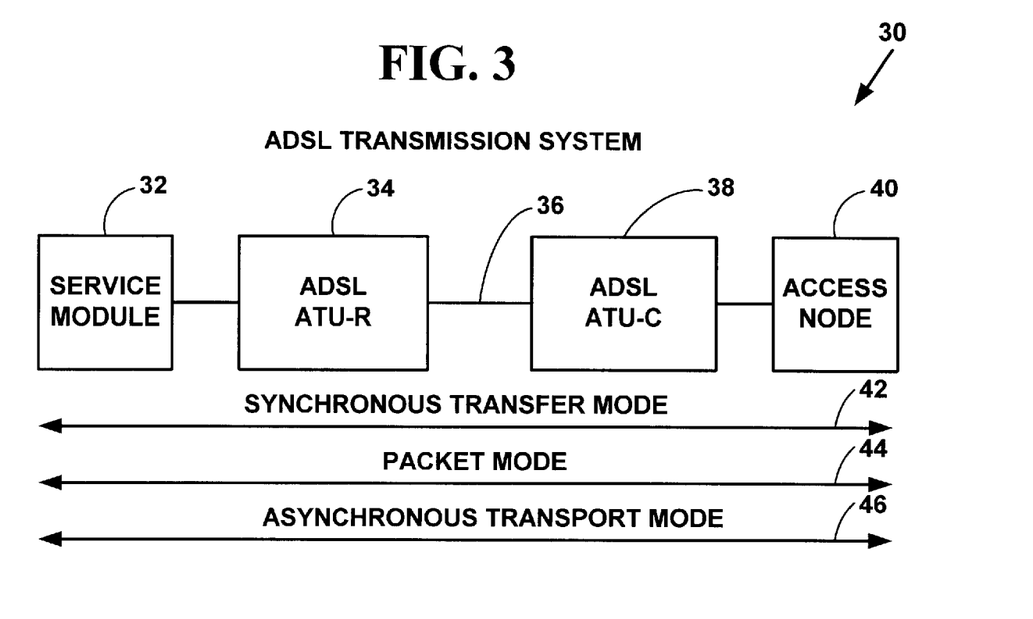
FIG. 3 is a block diagram illustrating an exemplary asymmetric digital subscriber line data transmission system.

FIG. 3 is a block diagram illustrating an exemplary asymmetric digital subscriber line data transmission system 30 for one exemplary a preferred embodiment of the present invention. In the asymmetric digital subscriber line data transmission system 30, data is transmitted at a higher data rate in downstream direction, than in an upstream direction. However, the asymmetric data transmission can also be reversed. The asymmetric data asymmetric digital subscriber line transmission system 30 includes a service module 32, an ADSL ATU-R device 34, an ADSL connection 36 comprising a twisted pair of copper wires, an ADSL ATU-C device 38 and an access node 40 (e.g., a Digital Subscriber Line Access Multiplexer ("DSLAM")).

The asymmetric data transmission system 30 also includes the capability for a synchronous transfer mode 42, a packet transfer mode 44 and an ATM 46. However, the asymmetric data transmission system 30 is not limited the network devices, connection or transfer modes illustrated in FIG. 3, and more or fewer network devices connections or transfer modes can also be used.

As was described above, an ADSL ATU-R device 36 is a network device at an end of the ADSL connection 36 at a subscriber or customer site. The ADSL ATU-R device 36 may be integrated into a service module 32. The ADSL ATU-C device 40 is a network device at an end of the ADSL connection 36 at a telephony switch. The ADSL ATU-C device 40 may be integrated within the access node 42. The ADSL ATU-R and ADSL ATU-C ADSL devices include but are not limited to ADSL devices from 3Com Corporation of Santa Clara, Calif., Cisco Systems of San Jose, Calif., Erickson, Stockhom, Sweden, and others.

The service module 32 converts digital signals into signals suitable for use on a subscriber or customer site. The access node 42 typically includes digital loop carrier systems concentrating individual voice lines to T1 lines, cellular antenna sites, Private Branch Exchanges ("PBXs"), Optical Network Units ("ONUs") and other wireline and wireless carrier systems. In one exemplary preferred embodiment of the present invention, the asymmetric data transmission system 30 includes a ADSL network device compliant with all or part of ANSI or ITU ADSL standards (e.g., ANSI-T1.413-1995 or ITU-G.992.1-1999). In another exemplary preferred embodiment of the present invention, the asymmetric data transmission system 30 includes a splitterless ADSL data transmission system, or G.lite data transmission system the network devices in such a system are compliant with all or part of the ITU spliterless ADSL standard (e.g., ITU-G.992.2-1999). Splitters are not illustrated in FIG. 3, and may or may not be used in asymmetric data transmission system 30. However, the present invention is not limited to this embodiment and other asymmetric data transmission systems and other standards can also be used.

Exemplary asymmetric digital subscriber line device flow control

Figure 4A:
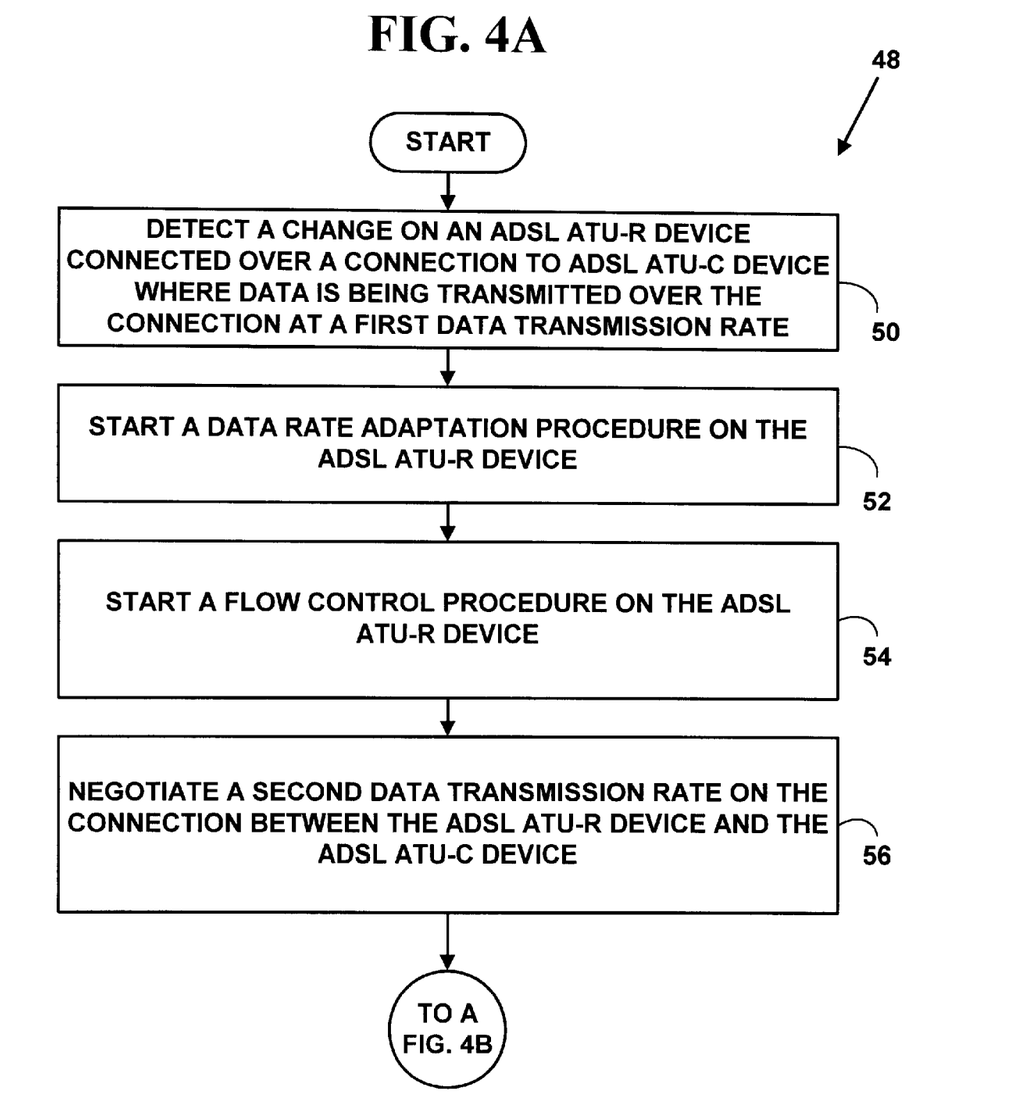
FIGS. 4A and 4B are a flow diagram illustrating a method for flow control in an asymmetric digital subscriber line data transmission system.
Figure 4B:
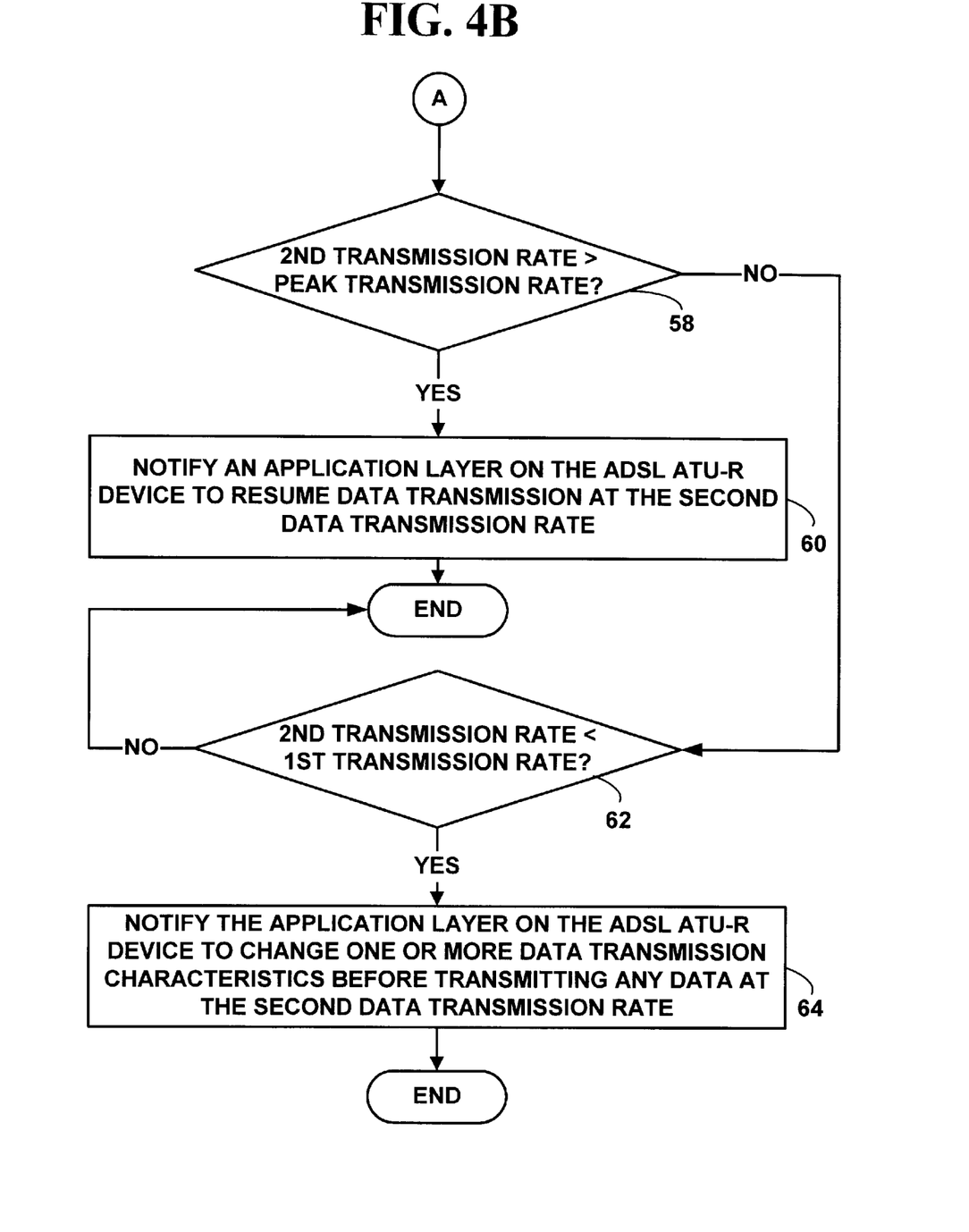

FIGS. 4A and 4B are a flow diagram illustrating a Method 48 for flow control in an ADSL data transmission system. At Step 50 of FIG. 4A, a change is detected on an ADSL ATU-R device 34 on an ADSL connection 36 between the ADSL ATU-R device 34 and an ADSL ATU-C device 38 in an ADSL transmission system 30. Data is transmitted at a higher data rate in a downstream direction, than in an upstream direction on the ADSL data transmission system 30. However, the asymmetric data transmission can also be reversed. Data is being transmitted on the ADSL connection 36 between the ADSL ATU-R device 34 and the ADSL ATU-C device 38 at a first data transmission rate. Step 50 includes but is not limited to detecting any of a noise signal, an on-hook signal, an off-hook signal, or a ringing-signal or other signal on the ADSL connection 36.

At Step 52, a data rate adaptation procedure is started on the ADSL ATU-R device 34 to adapt the first data transmission rate based on the changed condition on the ADSL connection 36. The data rate adaptation procedure includes, but is not limited to an ADSL "Fast Retrain" procedure. However, other data rate adaptation procedures could also be used and the present invention is not limited to the ADSL "Fast Retrain" procedure. As is known in the art, the Fast Retrain procedure includes quickly adjusting to line conditions including amplitude response, delay distortions, timing recovery and echo characteristics in an ADSL transmission system.

At Step 54, a flow control procedure is invoked on the ADSL ATU-R device 34. The flow control procedure includes but is not limited to buffering outbound data and notifying an application layer on the ADSL ATU-R 34 device to temporarily cease data transmission at the first data transmission rate.

At Step 56, a second data transmission rate is negotiated on the ADSL connection 36 between the ADSL ATU-R device 34 and the ADSL ATU-C device 36 based on the change on the connection. At Step 58 of FIG. 4B, a test is conducted to determining whether the second data transmission rate is faster than a peak data rate. Step 58 includes but is not limited to determining if the second data transmission rate is faster than a peak cell rate used for ATM cell transmission on the ADSL connection.

If the second data transmission rate is faster than a peak data rate, at Step 60, the application layer on the ADSL ATU-R device 34 is notified to resume data transmission at the second data transmission rate without changing data transmission characteristics used for the first data transmission rate.

If the second data transmission rate is not faster than a peak data rate at Step 60, then at Step 62 another test is conducted to determining whether the second data transmission rate is slower than the first data transmission rate. Step 62 includes but is not limited to determining if the second data transmission rate is slower than a current cell rate used for ATM cell transmission on the ADSL connection.

If the second data transmission rate is slower than the first data transmission rate, at Step 64 the application layer on the ADSL ATU-R device 34 is notified to change one or more data transmission characteristics used for the first data transmission rate before transmitting any data at the second data transmission rate.

Step 64 includes, but is not limited to, changing one or more data transmission characteristics for any of available bit-rate characteristics, unspecified bit-rate characteristics, variable bit-rate characteristics, or constant bit-rate characteristics used for ATM cell transmission on the ADSL connection 36. As is known in the art, the ATM Adaptation Layer ("AAL") provides a range of alternative service types/classes for the transport of octet steams/messages generated by higher protocol layers. The ATM AAL service types can be used to provide a Quality-of-Service ("QoS") on a connection. The ATM AAL services types for QoS are classified according to three criteria: (1) the existence of a timing relationship between a source and destination; (2) a bit rate associated with a transfer; and (3) a connection mode. Table 1 illustrates the ATM AAL services types/classes. The ATM AAL can also use an Available Bit-Rate service ("ABR") or an Unspecified Bit-Rate service ("UBR") as part of a QoS with an AAL classes from Table 1.

TABLE 1

| AAL type | AAL Class | Remarks |
|---|---|---|
| AAL-1 | Class A | Constant Bit-Rate Service ("CBR") Connection-oriented service. Timing relation required between source and destination. |
| AAL-2 | Class B | Variable Bit-Rate Service ("VBR") Connection-oriented service. Timing relation required between source and destination. |
| AAL-3/4 | Class C | Variable Bit-Rate Service ("VBR") Connection-oriented service or Connection-less service. No timing relation required between source and destination. |
| AAL-5 | Class D | Variable Bit-Rate Service ("VBR") Connection-oriented service. No timing relation required between source and destination. |

At Step 64, ATM ABR characteristics can be changed by determining whether the second data transmission rate is between a peak and a minimum cell data transmission rate. If the second data transmission rate is between a peak and a minimum cell data transmission rate an ATM egress cell data transmission rate is adjusted to the second data transmission rate.

If the second data transmission rate is not between a peak and a minimum cell data transmission rate, another test is conducted to determine whether the second data transmission rate is below a minimum cell data transmission rate. If the second data transmission rate is below the minimum cell data transmission rate, the peak and minimum cell data transmission rates are set equal to the second data transmission rate. Traffic shaping is optionally performed on cells transmitted at the second data transmission rate.

As is known in the art, "traffic shaping" is used to smooth out a data traffic flow and reduce cell clumping. Traffic shaping results in re-allocation of transmission resources and reduces an average time delay. In one exemplary embodiment of the present invention, a "leaky bucket" method is used for traffic shaping. However, other traffic shaping methods can also be used and the present invention is not limited to a leaky bucket method. For more information on traffic shaping see "ISDN, Broadband ISDN with Frame Relay and ATM," by William Stallings, 3rd Edition, Prentice-Hall, Englewood Cliffs, N.J., 1995, ISBN-0-02-415513-6, incorporated herein by reference.

For leaky bucket traffic shaping, a token generator produces tokens at a rate of P-tokens-per-second and places these cells in a token bucket, which has a maximum capacity of B-tokens. Cells arriving from a source are placed in a buffer with a maximum capacity of K-cells. To transmit a cell, one token is removed from the token bucket. If the token bucket is empty, the cell is queued waiting for the next token. The result of this method is that if there is a backlog of cells and an empty bucket, then cells are emitted at a smooth flow of P-cells-per-second with no cell delay variation until the backlog is cleared. Thus, the leaky bucket method smoothes out bursts of cells.

At Step 64, ATM UBR characteristics can also be changed. A peak cell data transmission rate is set to be less than or equal to the second data transmission rate. Traffic shaping is optionally preformed on cells transmitted at the second data transmission rate.

At Step 64, ATM VBR characteristics can also be changed. An application is notified that an ATM Quality-of-Service is being violated. A test is conducted to determine whether an application layer on the ADSL ATU-R device 34 desires to continue cell data transmission at the second data transmission rate. If the application layer desires to continue cell data transmission at the second data transmission rate, traffic shaping is performed "upstream," i.e., from the ADSL ATU-R device 34 to the ADSL ATU-C device 38 on the cells transmitted at the second data transmission rate. If the application layer does not desire to continue cell data transmission at the second data transmission rate traffic, data transmission is terminated on the ADSL connection 36.

At Step 64, ATM CBR characteristics can also be changed. The application layer is notified that an ATM Quality-of-Service is being violated. Data transmission is terminated on the ADSL connection 36.

The present invention may help adapt ADSL transmission characteristics to changing line conditions without decreasing data traffic throughput. The present invention may be especially useful for maintaining quality of transmission at a lower transmission rate, using splitterless ADSL (e.g., G.lite).

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only. The illustrated embodiments should not be taken as limiting the scope of the present invention.

For example, the steps of the flow diagrams may be taken in sequences other than those described, and more or fewer elements may be used in the block diagrams. While various elements of the preferred embodiments have been described as being implemented in software, in other embodiments hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

I claim:

1. A method for flow control in an asymmetric data transmission system, comprising the steps of:

detecting a change on a first asymmetric network device on a connection between the first asymmetric network device and a second asymmetric network device in an asymmetric data transmission system, wherein data is transmitted at a higher data rate in downstream direction, than in an upstream direction on the asymmetric data system, and wherein data is being transmitted on the connection between the first asymmetric network device and the second asymmetric network device at a first data transmission rate;

starting a data rate adaptation procedure on the first asymmetric network device to adapt the first data transmission rate based on the changed condition on the connection;

invoking a flow control procedure on the first asymmetric network device, wherein the flow control procedure includes buffering outbound data and notifying an application layer on the first asymmetric network device to temporarily cease data transmission at the first data transmission rate;

negotiating a second data transmission rate on the connection between the first asymmetric network device and the second asymmetric network device based on the change on the connection; and adjusting the data transmission rate on the first asymmetric network device to use the second data transmission rate on the connection between the first asymmetric network device and the second asymmetric network device, wherein adjusting the data transmission rate includes notifying the application layer on the first asymmetric network device to resume data transmission at the second data transmission rate.

2. A computer readable medium having stored therein instructions for causing a central processing unit to execute the method of claim 1.

3. The method of claim 1 wherein the asymmetric data transmission system is an Asymmetric Digital Subscriber Line system including asymmetric network devices compliant with all or part of any of the International Telephone Union G.922.1 standard or the American National Standards Institute T1.413 standard.

4. The method of claim 1 wherein the asymmetric data transmission system is a spliterless Asymmetric Digital Subscriber Line system including asymmetric network devices compliant with all or part of the International Telephone Union G.922.2 (G.lite) standard.

5. The method of claim 1 wherein the first asymmetric network device is an Asymmetric Digital Subscriber Line ATU-R network device.

6. The method of claim 1 wherein the second asymmetric network device is an Asymmetric Digital Subscriber Line ATU-C network device.

7. The method of claim 1 wherein the step of detecting a change on a first asymmetric network device on a connection includes detecting any of a noise signal, an on-hook signal, an off-hook signal, or a ringing-signal on the connection.

8. The method of claim 1 wherein the step of adjusting the data transmission rate on the first asymmetric network device to use the second data transmission rate on the connection includes:

determining whether the second data transmission rate is faster than a peak data rate, and if so, notifying the application layer on the first asymmetric network device to resume data transmission at the second data transmission rate without changing data transmission characteristics used for the first data transmission rate.

9. The method of claim 8 wherein the peak data rate is a peak cell rate used for Asynchronous Transfer Mode cell transmission on the connection.

10. The method of claim 1 wherein the step of adjusting the data transmission rate on the first asymmetric network device to use the second data transmission rate on the connection includes:

determining whether the second data transmission rate is slower than the first data transmission rate, and if so, notifying the application layer on the first asymmetric network device to change one or more data transmission characteristics used for the first data transmission rate before transmitting any data at the second data transmission rate.

11. The method of claim 10 wherein the data transmission characteristics used for the first transmission rate include any of available bit-rate characteristics, unspecified bit-rate characteristics, variable bit-rate characteristics, or constant bit-rate characteristics used for used for Asynchronous Transfer Mode cell transmission on the connection.

12. A method for flow control in an asymmetric data transmission system, comprising the steps of:

detecting a change on an asymmetric digital subscriber line ATU-R device on a connection between the asymmetric digital subscriber line ATU-R device and an asymmetric digital subscriber line ATU-C device in an asymmetric data transmission system, wherein data is transmitted at a higher data rate in downstream direction, than in an upstream direction on the asymmetric data system, and wherein data is being transmitted on the connection between the asymmetric digital subscriber line ATU-R device and the asymmetric digital subscriber line ATU-C device at a first data transmission rate;

starting a data rate adaptation procedure on the asymmetric digital subscriber line ATU-R device to adapt the first data transmission rate based on the changed condition on the connection;

invoking a flow control procedure on the asymmetric digital subscriber line ATU-R device, wherein the flow control procedure includes buffering outbound data and notifying an application layer on the asymmetric digital subscriber line ATU-R device to temporarily cease data transmission at the first data transmission rate;

negotiating a second data transmission rate on the connection between the asymmetric digital subscriber line ATU-R device and the asymmetric digital subscriber line ATU-C device based on the change on the connection;

determining whether the second data transmission rate is faster than a peak data rate, and if so, notifying the application layer on the asymmetric digital subscriber line ATU-R device to resume data transmission at the second data transmission rate without changing data transmission characteristics used for the first data transmission rate, and if not, determining whether the second data transmission rate is slower than the first data transmission rate, and if so, notifying the application layer on the asymmetric digital subscriber line ATU-R asymmetric network device to change one or more data transmission characteristics used for the first data transmission rate before transmitting any data at the second data transmission rate.

13. A computer readable medium having stored therein instructions for causing a central processing unit to execute the method of claim 12.

14. The method of claim 12 wherein the asymmetric data transmission system is an Asymmetric Digital Subscriber Line system including asymmetric network devices compliant with all or part of any of the International Telephone Union G.922.1 standard or the American National Standards Institute T1.413 standard.

15. The method of claim 12 wherein the asymmetric data transmission system is a spliterless Asymmetric Digital Subscriber Line system compliant with all or part of the International Telephone Union G.922.2 (G.lite) standard.

16. The method of claim 12 wherein the step of starting a procedure on the asymmetric digital subscriber line ATU-R device to adapt the first data transmission rate based on the changed condition on the asymmetric digital subscriber line connection includes starting an asymmetric digital subscriber line fast retrain procedure.

17. The method of claim 12 wherein the step of determining whether the second data transmission rate is faster than a peak data rate includes determining if the second data transmission rate is faster than a peak cell rate used for Asynchronous Transfer Mode cell transmission on the connection.

18. The method of claim 12 wherein the step of determining whether the second data transmission rate is slower than the first data transmission rate includes determining if the second data transmission rate is slower than a current cell rate used for Asynchronous Transfer Mode cell transmission on the connection.

19. The method of claim 12 wherein the step of notifying the application layer on the asymmetric digital subscriber line ATU-R device to change one or more data transmission characteristics used for the first data transmission rate before transmitting any data at the second data transmission rate includes changing one or more data transmission characteristics used for any of available bit-rate characteristics, unspecified bit-rate characteristics, variable bit-rate characteristics, or constant bit-rate characteristics used for used for Asynchronous Transfer Mode cell transmission on the connection.

20. The method of claim 12 wherein the step of notifying the application layer on the asymmetric digital subscriber line ATU-R to change one or more data transmission characteristics used for the first data transmission rate before transmitting any data at the second data transmission rate includes changing Asynchronous Transfer Mode available bit-rate characteristics by:

determining whether the second data transmission rate is between a peak and a minimum cell data transmission rate, and if so, adjusting an Asynchronous Transfer Mode egress cell data transmission rate to the second data transmission rate; and if not, determining whether the second data transmission rate is below the minimum cell data transmission rate, and if so, setting the peak and minimum cell data transmission rates equal to the second data transmission rate; and optionally performing traffic shaping on cells transmitted at the second data transmission rate.

21. The method of claim 12 wherein the step of notifying the application layer on the asymmetric digital subscriber line ATU-R device to change one or more data transmission characteristics used for the first data transmission rate before transmitting any data at the second data transmission rate includes changing Asynchronous Transfer Mode unspecified bit-rate characteristics by:

setting a peak cell data transmission rate to be less than or equal to the second data transmission rate; and optionally performing traffic shaping on cells transmitted at the second data transmission rate.

22. The method of claim 12 wherein the step of notifying the application layer on the asymmetric digital subscriber line ATU-R device to change one or more data transmission characteristics used for the first data transmission rate before transmitting any data at the second data transmission rate includes changing Asynchronous Transfer Mode variable bit-rate characteristics by:

notifying the application layer that a Asynchronous Transfer Mode Quality-of-Service is being violated;

determining whether the application layer desires to continue cell data transmission at the second data transmission rate, and if so, performing traffic shaping upstream from the asymmetric digital subscriber line ATU-R device to the asymmetric digital subscriber line ATU-C device on the cells transmitted at the second data transmission rate; and if not, terminating data transmission on the connection.

23. The method of claim 12 wherein the step of notifying the application layer on the asymmetric digital subscriber line ATU-R device to change one or more data transmission characteristics used for the first data transmission rate before transmitting any data at the second data transmission rate includes changing Asynchronous Transfer Mode constant bit-rate characteristics by:

notifying the application layer that an ATM Quality-of-Service is being violated; and terminating data transmission on the connection.

* * * * *